United States Patent [19]
Liu

[11] Patent Number: 5,443,551
[45] Date of Patent: Aug. 22, 1995

[54] WIPER ACTUATING MECHANISM FOR AN OIL-PRESSURE GAUGE

[76] Inventor: Paul Liu, Room 1004, No. 600, Min Chuan E. Road, Taipei, Taiwan

[21] Appl. No.: 229,785

[22] Filed: Apr. 19, 1994

[51] Int. Cl.$^6$ ............................ G01L 9/02; G01L 27/00
[52] U.S. Cl. ........................................ 73/725; 73/4 R
[58] Field of Search ................ 73/706, 707, 715, 723, 73/725, 115, 516 R, 4 R; 338/42

[56] References Cited
U.S. PATENT DOCUMENTS

| | | | |
|---|---|---|---|
| 4,718,278 | 1/1988 | Bergsma | 73/725 |
| 5,040,420 | 8/1991 | Murphy, Jr. et al. | 73/723 |

*Primary Examiner*—Hezron E. Williams
*Assistant Examiner*—William L. Oen
*Attorney, Agent, or Firm*—Brwody and Neimark

[57] ABSTRACT

A wiper actuating mechanism for use in an oil pressure measuring gague is equipped with an additional auxiliary spring plate and a push rod guide sleeve in addition to an improved two-arm wiper and a round diaphram board which is provided with a vertical flange on the periphery thereof for confining a rubber packing in place. The two-arm wiper can assure constant contact of the wiper with two sides of a winding board on which a resistive wire is attached; and the push rod guide sleeve can retain a slidable push rod in place which is not welded to the diaphram board and to move linearly so as to precisely pivot the two-arm wiper; the auxiliary spring plate disposed right under the diaphram board is also intended to reinforce the operation of the diaphram.

2 Claims, 9 Drawing Sheets

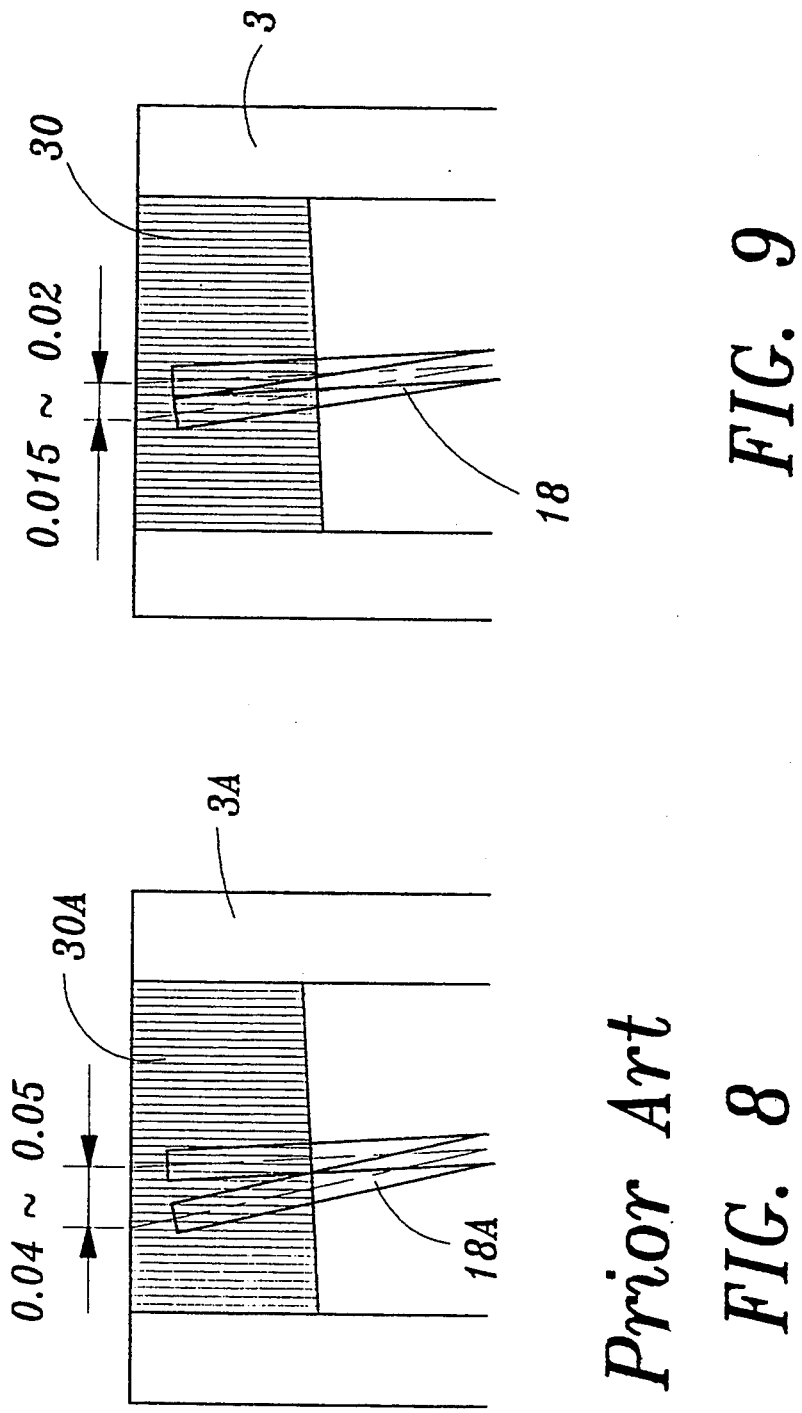

WIPER ACTUATING MECHANISM FOR AN OIL-PRESSURE GAUGE

BACKGROUND OF THE INVENTION

1. Field of the invention

The present invention relates to an improved wiper actuating mechanism particularly adapted for use in an oil pressure actuated gauge. It is additionally equipped with an auxiliary spring plate, a pair of wipers, a push rod guide piece and a diaphram board with vertical flange along the periphery thereof so that the operational accuracy of an oil gauge can be effectively advanced.

2. Description of the prior art

In the prior art actuating mechanism as shown in FIG. 1, there are only basic elements provided to actuate a wiper 18A that include a diaphram board 10A having a corrugated cross section, a rubber seal 4A, a push rod 12A, an upper cap 1A and a lower case 2A. The lower case 2A has a central opening for the location of the push rod 12A which is disposed in abutment with the diaphram board 10A and slidably moves up and down in response to the variation of the oil pressure delivered via a pore 40A of a bolt 45A secured to the upper cap 1A. To prevent high pressure oil from leaking from the actuating mechanism housed in between the upper cap 1A and the lower case 2A, the rubber seal 4A is disposed in sealing engagement with the round diaphram board 10A having a flat periphery.

In the above cited prior art, the rubber seal 4A is not restrained by the diaphram board 10A so that it can be deformed into irregular shape in assembly and will have bad effect on the operation of the diaphram board 10A.

Furthermore, the prior art push rod 12A is not limited by any guide piece and is welded to the diaphram board 10A by way of a connection pin. The push rod 12A can be easily offset a little bit when the diaphram 10A is not evenly actuated, causing the wiper 18A to pivot in a less accurate manner.

The one piece wiper 18A is mounted onto a spring biased pivot mount 20A and is in pivotal conductive contact with a -shaped winding board. An adjustable actuation pin 25A secured to the pivot mount 20A is in abutment with a point adjacent to the top periphery of the push rod so that the up and down movement causes the spring biased pivot mount and the wiper to pivot according to the distance of the motion of the push rod actuated by the diaphram driven by oil pressure. The single wiper 18A can easily go out of contact with the winding board 3A periodically due to the vibration of of a vehicle.

Moreover, the wiper can pivot in either direction in accordance with the up or down vibration of the diaphram board 10A and the outcomes of measurement in such cases are slightly different, and the error can be as much as 0.04–0.05 mm, as shown in FIG. 8.

SUMMARY OF THE INVENTION

Therefore, the primary object of the present invention is to provide an improved wiper actuating mechanism particularly for use in an oil pressure gauge wherein an additional auxiliary spring plate is disposed right under the diaphram board thereof so as to advance the operational accuracy of the oil gauge.

Another object of the present invention is to provide an improved wiper actuating mechanism wherein the round diaphram board has a vertical flange around the periphery thereof for confining a rubber packing or oil ring in place.

One further object of the present invention is to provide an improved wiper actuating mechanism wherein the wiper has two symmetric abutment arms each of which are in sliding contact with one side of a winding board of the actuating mechanism.

One still further object of the present invention is to provide an improved wiper actuating mechanism wherein a push rod guide sleeve is disposed at the center of the lower case of the mechanism housing case so as to permit a push rod to be slidably guided therein.

BRIEF DESCRIPTION OF THE DRAWINGS

FIG. 8 is a diagram showing the error produced in a conventional wiper actuating mechanism;

FIG. 9 is a diagram showing the error produced in the present invention;

DETAILED DESCRIPTION OF THE PREFERRED EMBODIMENTS

Figure 2:
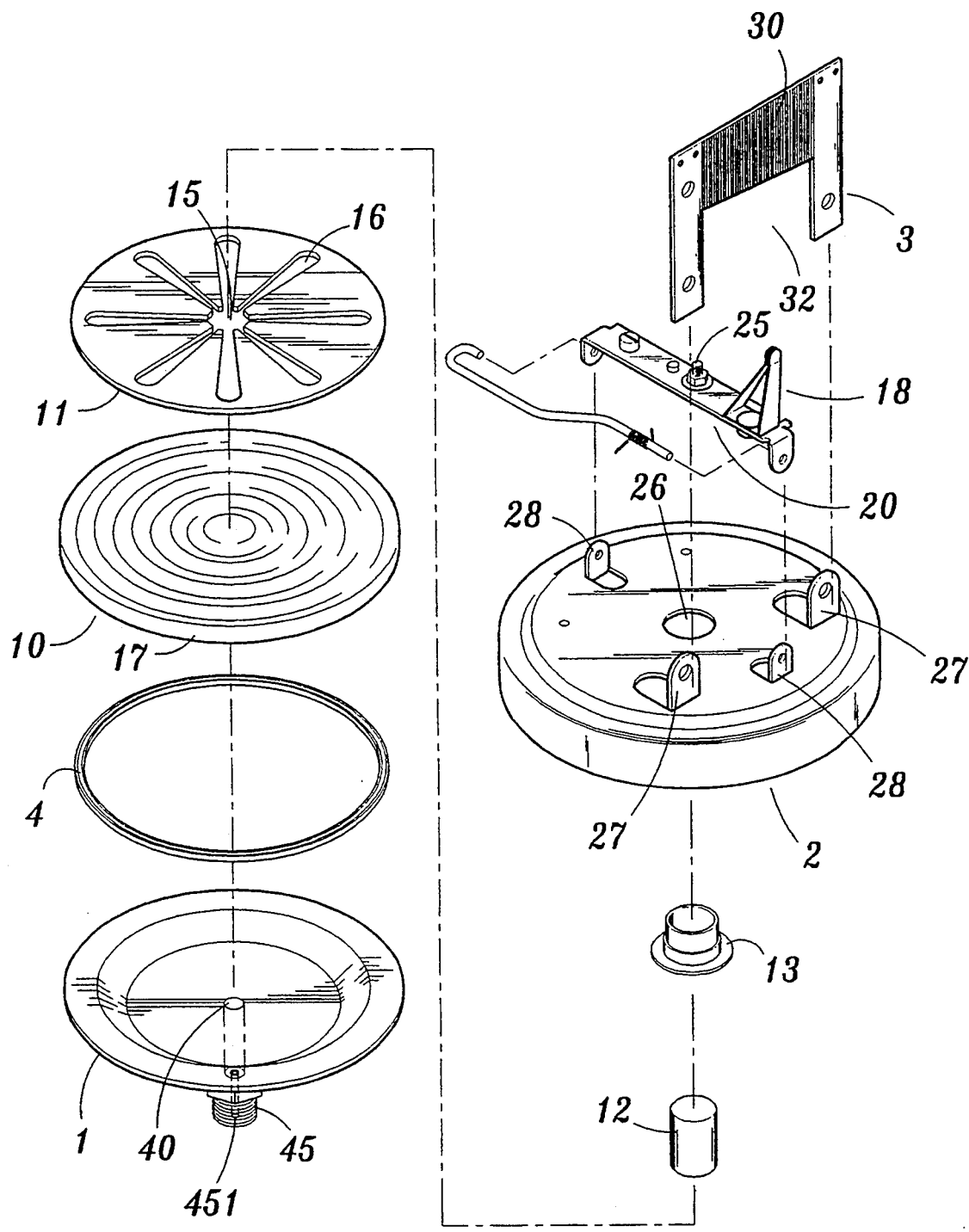
FIG. 2 is a perspective diagram showing the exploded components of the present invention.

Referring to FIG. 2, the improved wiper actuating mechanism of the present invention, particularly for use in an oil pressure gauge is comprised of an upper cap 1; a lower case 2; a rubber packing 4; a diaphram board 10; an auxiliary spring plate 11; a push rod guide sleeve 13; a tow-arm wiper 18; a spring biased wiper mounting seat 20; an adjustable actuation pin 25 mounted on said mounting seat 20 in contact with an off-set point on the periphery of the push rod 12 so as to make the mounting seat 20 pivot in response to the oil pressure delivered via an aperature 40 of the upper cap 1; a winding board 3 on which a well arranged resistive wire 30 is wound; a two-arm wiper 18 with each arm in contact with the resistive wire 30 disposed on each side of said winding board 3.

Figure 3:
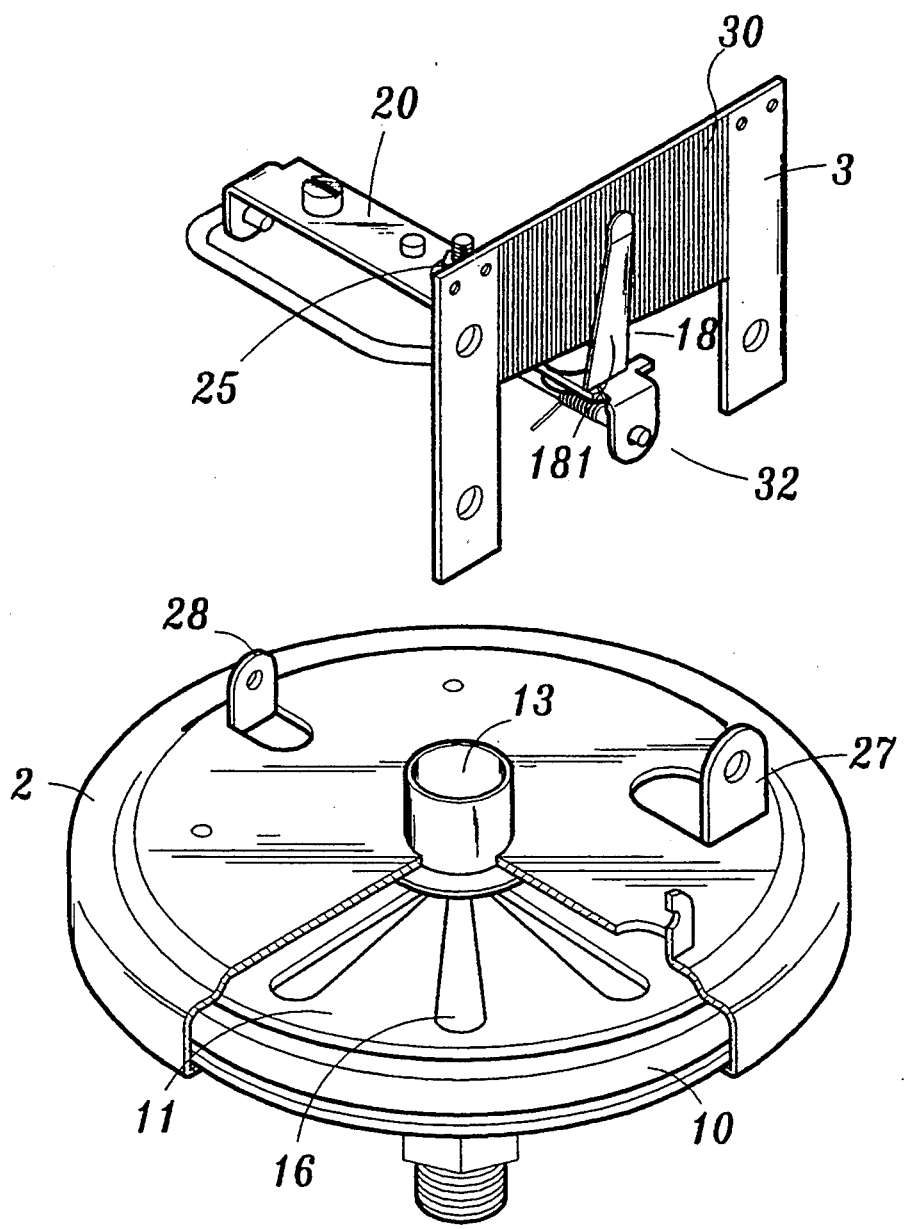
FIG. 3 is a partially cut-away diagram showing the arrangement of the components of the present invention.
Figure 5:
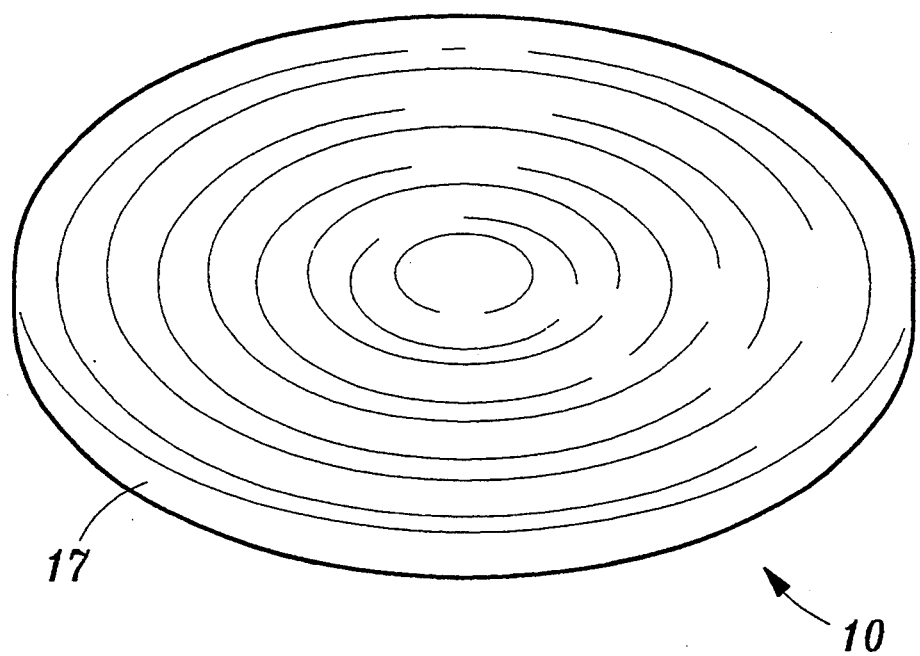
FIG. 5 is a diagram showing the structure of a diaphram board of the present invention.
Figure 5A:
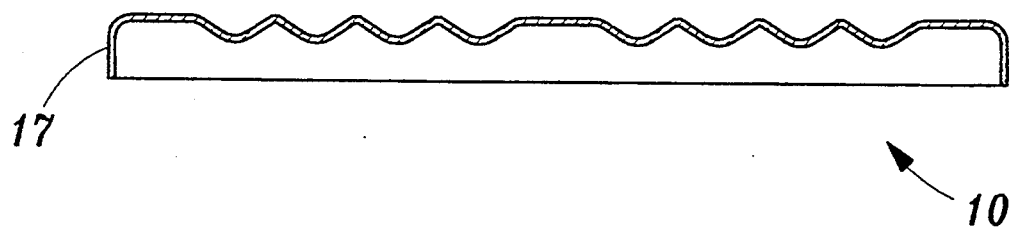
FIG. 5A is a sectional view of the diaphram.
Figure 7:
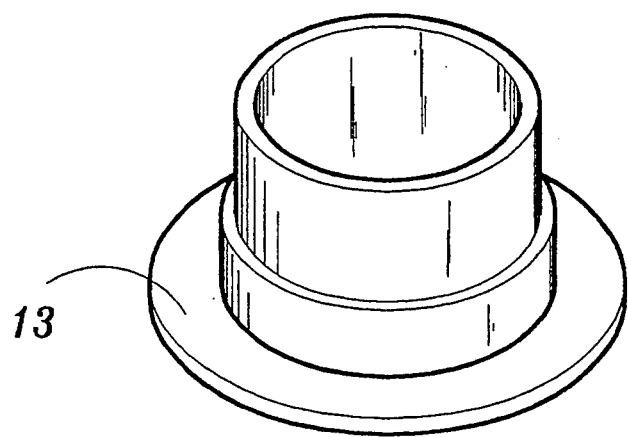
FIG. 7 is a diagram showing the structure of a push rod guide sleeve of the present invention.

As shown in FIG. 3, the lower case 2 is in tight sealing engagement with the upper cap 1 when assembled so as to form a housing room for the diaphram board and oil ring and other components. Referring to FIGS. 5, 5A, the diaphram board 10 has a corrugated cross section disposed under the rubber packing 4. The auxiliary spring plate 11 is disposed under and in abutment against the diaphram board 10. As shown in. FIG. 7, the push .rod guide sleeve 13 in which the push rod 12 is slidably confined is securely retained at a central opening 26 of the lower case 2.

Figure 4:
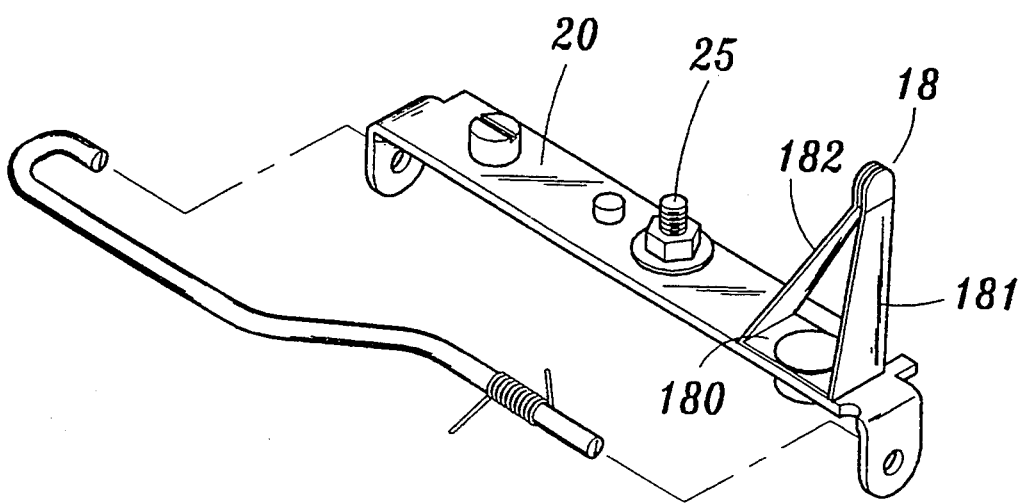
FIG. 4 is a diagram showing the two-arm wiper of the present invention.

As shown in FIG. 4, the two arm wiper 18 has two arms 181, 182 which extend from the respective end of a base 180 and bent into contact at their tips with each other. The winding board 3 is sandwiched in between the two arms 181, 182.

Figure 6:
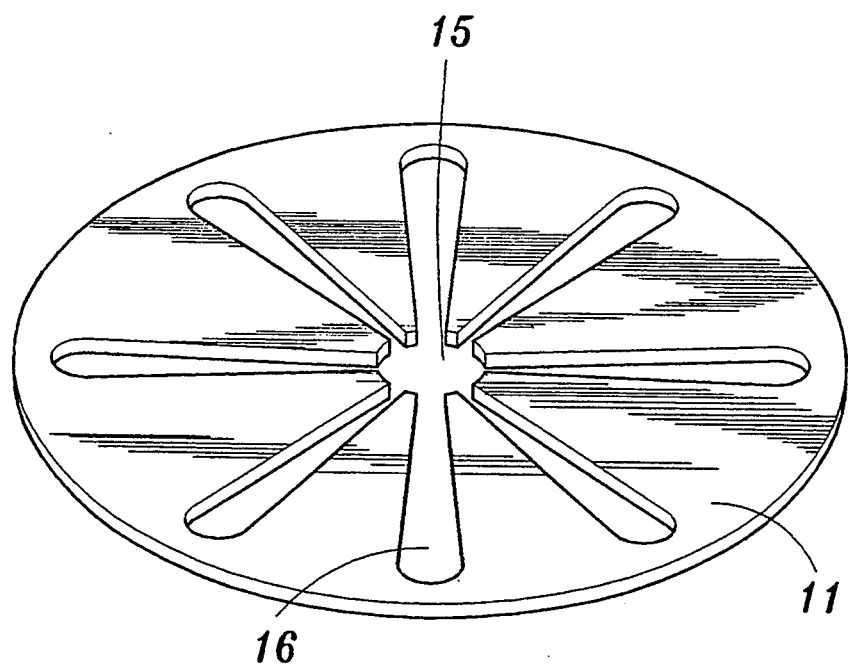
FIG. 6 is a diagram showing the structure of an auxiliary spring plate.

Referring to FIG. 6, the auxiliary spring plate 11 is equipped with a plurality of symmetrically disposed slots 16 terminating in a common central hole 15. The slots are sepeated with each other at a 45 degree angle.

The upper cap 1 is provided with a bolt like member 45 having a through aperture 451 in communication with the aperture 40 of the upper cap 1 for passage of oil which can actuate the diaphram board 10 to expand outwardly. The spring biased wiper mounting seat 20 is pivotally secured to the lugs 28 disposed at the bottom of the lower case 2 with the adjustable actuation pin 25 removably secured to the mounting seat 20 abutting against an off-set point ,on the periphery of the push rod 12 so as to permit the push rod 12 urged by the diaphram board 10 to pivot the mounting seat 20 to which the two-arm wiper 18 is fixed.

As the wiper 18 is pivoted to slide against the resistance wire 30 of the winding board 3, the total resistance thereof is varied accordingly as a result of the location of the wiper 18 being changed, causing the pointing hand of a gauge to pivot.

Figure 1:
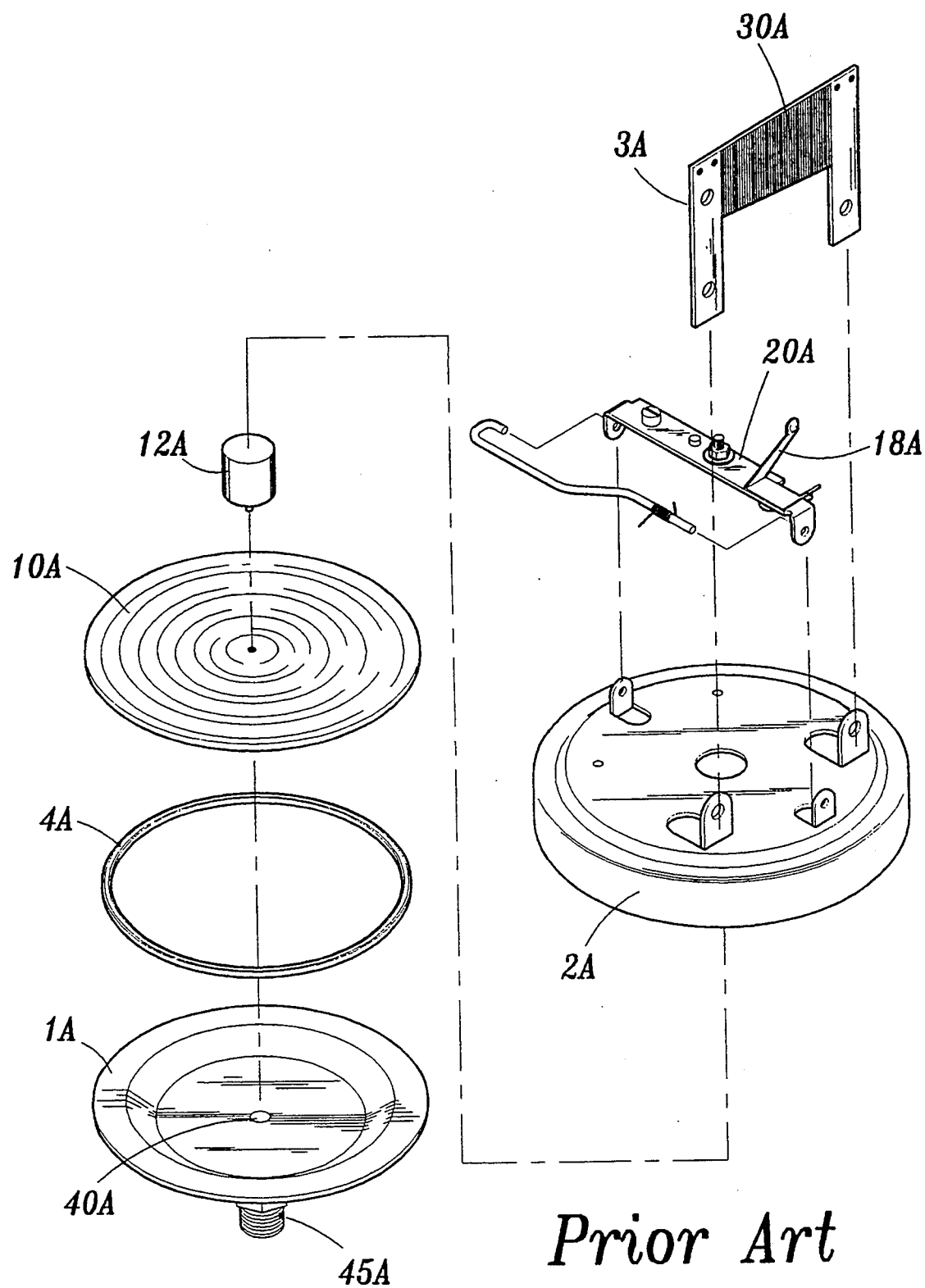
FIG. 1 is a perspective diagram showing the exploded components of a prior art wiper actuating mechanism.

Referring to FIG. 1, in the prior art oil gauge, the push rod 12A is riveted first to the center of the diaphram board 10A and then welded thereto. In contrast, the push rod 12 of the present invention is not fixed in place at all and is only confined in the push rod guide sleeve 13 and led through a central hole 15 of the auxiliary spring plate 11 and retained or supported between the diaphram board 10 and the actuation pin 25 so that expansional, movements of the diaphram board 10 can be translated into pivotal motions of the wiper 18.

The addition of the auxiliary spring plate 11 right under the diaphram board 10 can effectively improve the precision of an oil gauge. Erroneous discrepancy produced in operations in which the wiper 18 pivoted either in clockwise direction or counter clockwise direction, at an identical pressure, is located at a slightly different position. As shown in FIGS. 8, 9, the difference can be limited in the present case to a value from 0.015 mm to 0.020 mm, instead of in the range of 0.04–0.05 mm as in a prior art.

Furthermore, the conventional diaphram board 10 is made in a flat form with the rubber packing 4 located thereon without any restraint. Such arrangement makes the rubber packing 4 easily deformed out of shape as the upper cap 1 and the lower case 2 is forged together by force.

As shown in FIGS. 5, 5A, a peripheral vertical flange 17 is disposed on the diaphram board 10 of the present invention which is used to limit a rubber packing 4 in place so that the rubber packing 4 will not easily deform when the upper cap 1 and the lower case 2 are forged together.

Figure 10:
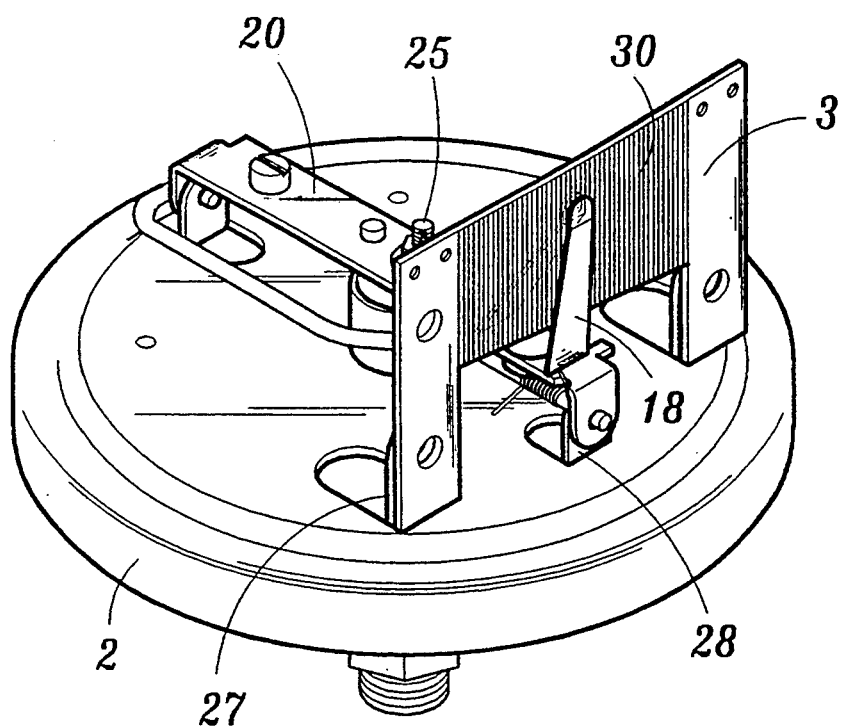
FIG. 10 is a diagram showing the practical assembly of the present invention.

Referring to FIG. 10, the two-arm wiper 18 having two contact arms fixed to the wiper mounting seat 20 which is pivotally secured to the lower case 2 by way of two retaining lugs 28. As shown in FIGS. 2, 3. The winding board 3 having a -shaped cut 32 and fixed also to the lower case 2 by a pair of lugs 27 is disposed therebetween so that the wiper is in firm contact with the winding board without temporary separation from the same as a result of serious vibration of a vehicle in operation, causing misreading on a conventioal oil gauge.

It is apparent that the above cited embodiment of the present invention can effectively increase the operational precision of an oil pressure gauge by the addition of a spring plate, a push rod guide sleeve, a two-arm wiper and a peripherally-flanged diaphram board. The proceeding embodiment is only used to demonstrate the features of the present invention and any modifications or changes based on the cited embodiment should be limited in the scope of the claims thereof.

I claim:

1. An improved wiper actuating mechanism particularly for use in an oil pressure gauge, comprising:
   an upper cap;
   a lower case being in tight sealing engagement with said upper cap;
   a packing means;
   a diaphram board disposed under said packing means;
   an auxiliary spring plate disposed under and in abutment against said diaphram board;
   a push rod disposed under said spring plate and in abutment with said diaphram board;
   a push rod guide sleeve in which said push rod is slidably confined being securedly retained at a central opening of said lower case;
   said upper cap being provided with a bolt like member having a through aperture for the passage of oil which can actuate said diaphram to expand;
   a spring biased wiper mounting seat which is pivotally secured to the bottom of said lower case by a pair of lugs;
   an adjustable actuation pin mounted on said mounting seat being in contact with an off-set point on the periphery of said push rod so as to make said mounting seat pivot in response to the oil pressure delivered via said aperture of said upper cap;
   a winding board on which a well arranged resistive wire is wound;
   a wiper means in contact with said resistive wire disposed on both sides of said winding board.

2. An improved wiper actuating mechanism as claimed in claim 1 wherein said wiper means is provided with two arms each of which is in contact with the resistance wire disposed on each side of said winding board, making the contact of the wiper means with said resistance wire in a more secure manner.

* * * * *